United States Patent

[11] 3,590,361

| [72] | Inventors | John D. Bishop<br>Basking Ridge;<br>Paul Mischenko, Morris Plains; Roman<br>Ostapiak, Parsippany, all of, N.J. |
|---|---|---|
| [21] | Appl. No. | 889,529 |
| [22] | Filed | Dec. 31, 1969 |
| [45] | Patented | June 29, 1971 |
| [73] | Assignee | Bell Telephone Laboratories, Incorporated<br>Murray Hill, Berkely Heights, N.J. |

[54] DC TO DC CONVERTER INCLUDING SWITCHING DEVICE HAVING ITS ON AND OFF TIMES INDEPENDENTLY CONTROLLED BY THE LINE AND LOAD VOLTAGES, RESPECTIVELY
8 Claims, 2 Drawing Figs.

[52] U.S. Cl. .................................................. 321/19,
                                                         323/22 T
[51] Int. Cl. ................................................. H02m 3/10
[50] Field of Search ............................. 321/18, 19;
                                                         323/22 T

[56] References Cited
UNITED STATES PATENTS

| 3,124,739 | 3/1964 | Wellford | 321/19 X |
|---|---|---|---|
| 3,226,630 | 12/1965 | Lampke | 323/22 (T) |
| 3,323,034 | 5/1967 | Dubin et al. | 323/22 (T) X |
| 3,366,872 | 1/1968 | Lemoine | 323/22 (T) |
| 3,383,584 | 5/1968 | Atherton | 323/22 (T)X |
| 3,461,374 | 8/1969 | Rhyne, Jr. | 321/19 X |
| 3,530,368 | 9/1970 | Gerard | 323/22 (T) |

*Primary Examiner*—William M. Shoop, Jr.
*Attorneys*—R. J. Guenther and E. W. Adams, Jr.

ABSTRACT: The duty cycle of the switching transistor in a DC to DC converter is controlled by an astable multivibrator whose alternate switching states are respectively responsive to the line and load voltages. Feedback of the output voltage to control the duration of one state of the multivibrator is obtained from the primary of the converter output transformer whose magnetic energy level is not allowed to fully dissipate in any one operating cycle. A balancing circuit arrangement is utilized to minimize variations in the base drive signal of the switching transistor and to prevent it from saturating to eliminate variations in the duration of the conducting state of the transistor due to charge storage.

DC TO DC CONVERTER INCLUDING SWITCHING DEVICE HAVING ITS ON AND OFF TIMES INDEPENDENTLY CONTROLLED BY THE LINE AND LOAD VOLTAGES, RESPECTIVELY

BACKGROUND OF THE INVENTION

This invention relates to DC to DC converter circuits and more particularly to regulated converter circuits having independent line and load regulation.

In some utility systems, such as telephone systems, it is desirable to have standby power sources in telephone offices to safeguard against the failure of commercial utility power sources and insure the continuity of operation of telephone equipment. The standby power in telephone systems is generally supplied by large battery sources which supply a standard negative 48 volts. The magnitude of this voltage tends to vary considerably within a certain range. For use in specific applications, it is necessary to regulate these voltages precisely and to convert the voltage magnitudes into more useful voltage ranges.

One method of deriving regulated voltages from a battery is through the use of a DC to DC converter. The present invention is concerned with converters which operate as time modulated signal gates. The regulation of power delivered to a load by such a converter is determined by the portion of each cycle that a switching device within the converter is conducting. During conduction a pulse waveform is transmitted by the switching device. In many of these DC to DC converters regulation is performed by varying the pulse duration within a constant time period during each cycle of operation. In these arrangements, the beginning of compensation for a variation in the line or load voltage is generally delayed until the next cycle of operation.

The typical DC to DC converter is additionally inherently susceptible to catastrophic failures because generally the input and output circuits are not completely isolated from each other. The voltage supply circuit is normally connected to the output by a transformer. However the output is generally coupled to the input by a feedback control arrangement which regulates the output voltage. Sometimes an additional transformer is included in the feedback circuit to secure isolation but this adds expense and weight to the converter. Isolation is a desirable feature aside from susceptibility to failures. Isolation is useful in applications where the polarity of the output ground may not be known. In this instance, it is desirable to have a usable output on either of the output leads.

It is therefore an object of the invention to respond to line voltage variations in a DC to DC converter within the cycle of operation in which the variations occur.

It is another object of the invention to initiate response to load voltage variations within the cycle in which the variation occurs.

It is yet another object of the invention to isolate the input and output circuits of a DC to DC converter without the necessity of including an additional transformer in the feedback path.

SUMMARY OF THE INVENTION

Therefore in accord with the invention, a converter including a switching device to convert a DC voltage to a regulated DC voltage of another level has a rapid response to correct for line voltage variations within the cycle of operation in which they occur. The converter responds to load voltage variations by rapidly beginning compensation within the cycle when the variation occurs. According to the invention, regulation of the voltage with a DC to DC converter is performed by storing energy in the primary inductive winding of a transformer during the time a switching transistor is conducting and then transferring the energy from the secondary of the transformer to the load when the switching transistor is nonconducting. The control of the ratio of the ON to OFF times of the switch is accomplished by a controlled astable multivibrator whose cross-coupled timing circuits are respectively responsive to the line voltage and the load voltage. The load voltage is monitored by detecting a direct function of the output voltage from the transformer primary for use in the feedback control. This detection scheme eliminates the need for an auxiliary feedback path to control switching.

A feature of the invention is a balancing circuit arrangement which minimizes variations in the drive current applied to the switching transistor during changes in the duty cycle.

BRIEF DESCRIPTION OF THE DRAWING

These and other objects and features, the nature of the invention, and its various advantages will be more readily understood upon consideration of the attached drawings and of the following detailed description.

In the drawings.

DETAILED DESCRIPTION

Figure 1:
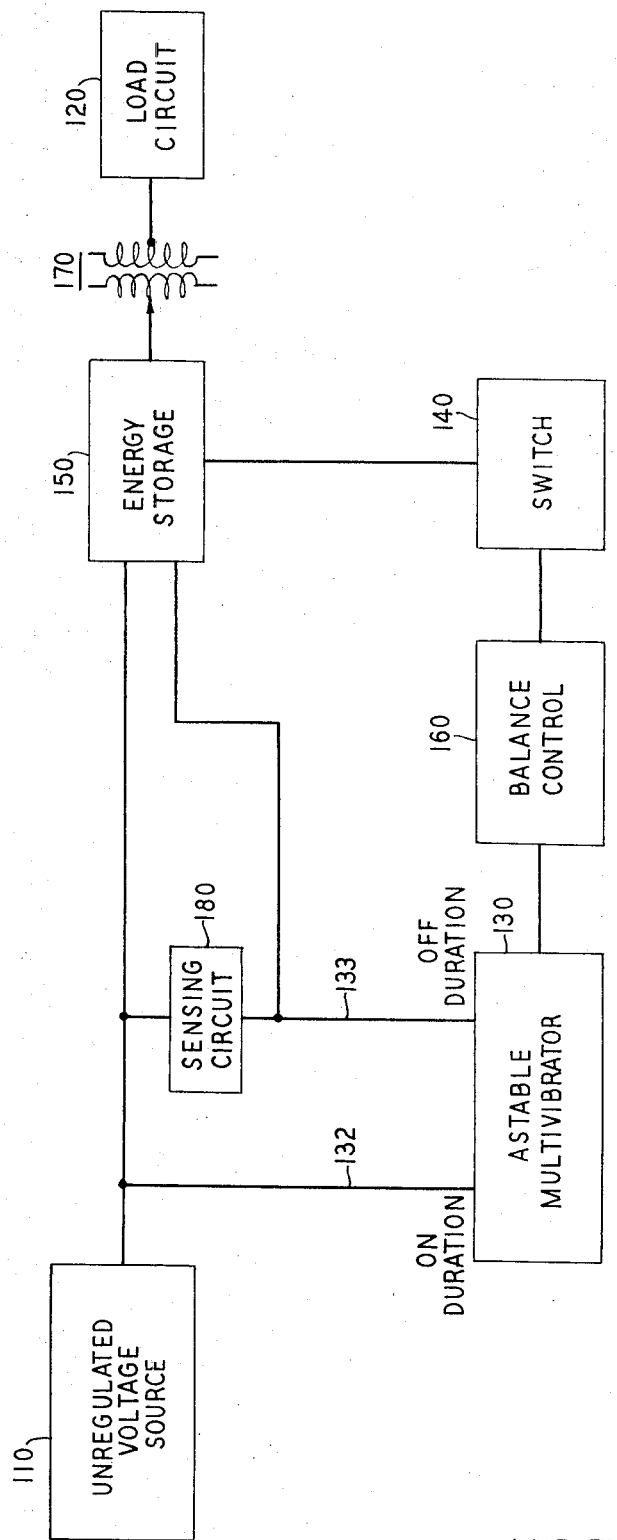
FIG. 1 is a block diagram of an illustrative embodiment of the invention to convert a DC voltage from one level to a regulated voltage at another level.

The DC to DC converter shown in block form in FIG. 1 converts the voltage supplied by an unregulated DC voltage source 110 to a regulated output voltage which is applied to a load circuit 120. The unregulated DC voltage source 110 will normally comprise a battery. However, it is to be understood that the converter may be coupled to other sources of DC energy. The regulation of the applied voltage is accomplished by converting the voltage into magnetic energy and storing it in the energy storage device 150. The energy storage device 150 in the illustrative embodiment is the magnetizing inductance of the transformer 170. The energy storage in the energy storage device 150 is controlled by a switch 140 which is responsive in turn to a free-running astable multivibrator 130. The switch 140 may suitably comprise a switching transistor. Energy is stored in the energy storage device when the switch 140 is conducting. The energy is then transferred to the secondary of the transformer 170 and hence to the load 120 when the switch 140 is not conducting.

The ratio of the conducting time to the nonconducting time of the switch 140 is controlled by the astable multivibrator 130. The durations of the alternate states of the astable multivibrator 130 are determined by the charging rates of the timing capacitors of its cross-coupled timing circuits. These charging rates are adjustable in response to external signal conditions. One of the charging rates is directly proportional to the magnitude of the unregulated voltage supplied by the voltage source 110. This unregulated voltage is coupled to one of the timing capacitors of the astable multivibrator 130, via lead 132, to control its charging time. The charging rate of the other cross-coupled timing capacitor is inversely proportional to a function of the output voltage at the load circuit 120. The function of the output voltage is derived from the primary voltage of the transformer 170 by the sensing circuit 180 during the time interval when the switch 140 is nonconducting. The sensing circuit 180 is coupled to the other cross-coupled timing capacitor of the astable multivibrator 130, via lead 133. By sensing the output voltage, via the primary of transformer 170, isolation between the input and output of the converter is achieved in its feedback circuit without the necessity of including an additional transformer.

A balance control 160 is inserted between the output of the astable multivibrator and the control lead of the semiconductor switch 140. The balance control 160 minimizes variations in the drive current applied to the semiconductor switch 140 due to changes in the duty cycle. By minimizing variations in the drive current, a lower drive current can be used to control the switching transistor over a large duty cycle range. A detailed description of the operation of the balance control 160 is described below with reference to FIG. 2.

Figure 2:
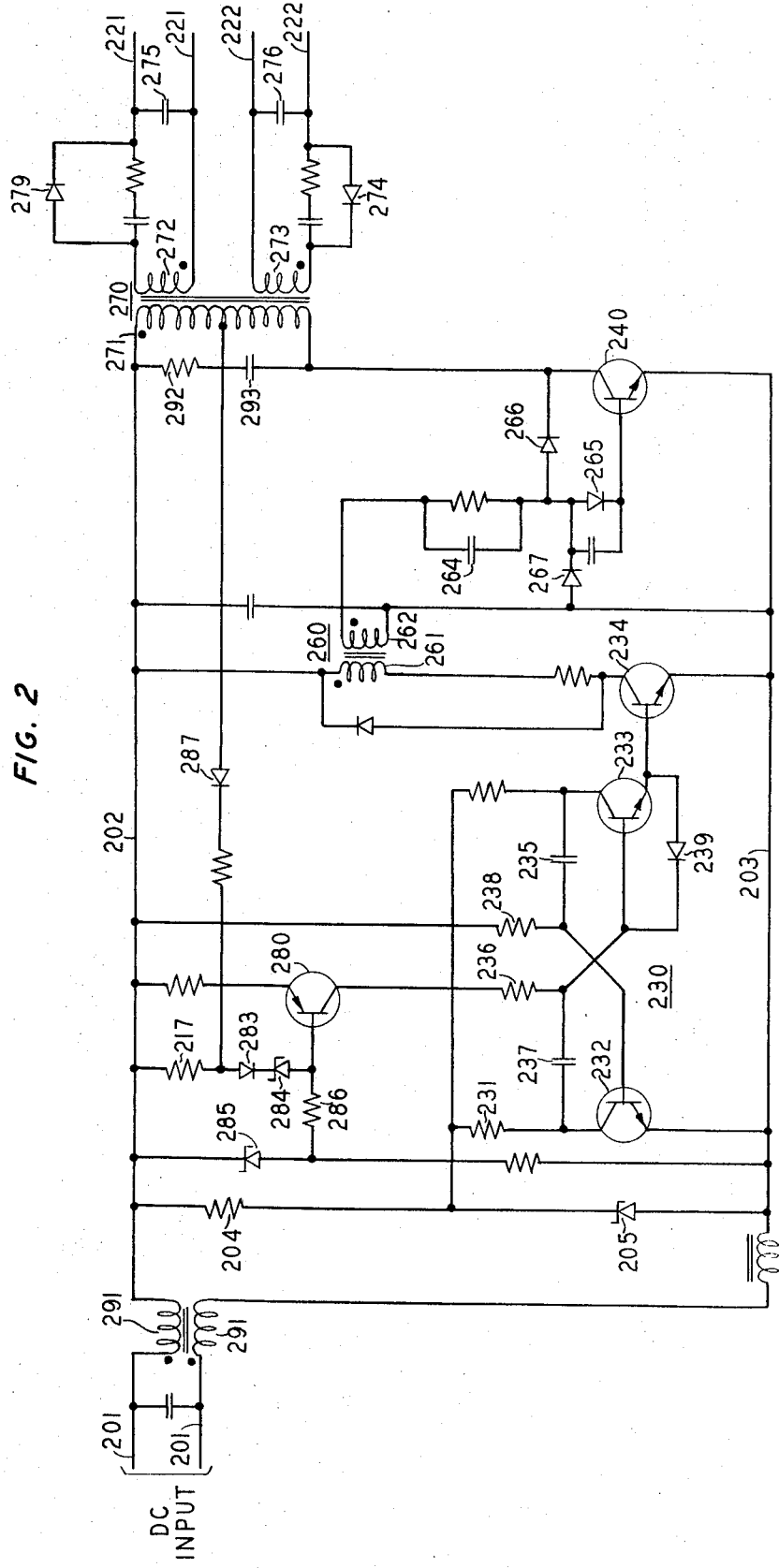
FIG. 2 is a schematic diagram of the illustrative embodiment of the invention to convert a DC voltage from one level to a regulated voltage at another level.

The converter circuit shown in detailed schematic form in FIG. 2 accepts voltage from an unregulated DC source coupled to the input terminals 201. This DC energy is applied via leads 202 and 203, and the emitter-collector path of a transistor switch 240, to the primary winding 271 of the transformer 270. Energy is stored in the magnetic core of the transformer 270, via the primary winding 271, when the transistor switch 240 in conducting. When the transistor switch 240 ceases to conduct the energy stored in the magnetic core of the transformer 270 is transmitted to the secondary windings 272 and 273. The energy of the secondary windings 272 and 273 is transmitted to the output leads 221 and 222, respectively, to which a load circuit may be attached.

The output voltage on leads 221 and 222 is regulated at a constant value by controlling the duty cycle of the switching transistor 240. The ON time in the switching transistor is varied inversely in response to variations in the input voltage. The OFF time is independent of variations in the input voltage. The output voltage variations are controlled by varying the OFF time of the switching transistor 240 in response thereto. The OFF time and ON time are independent of each other.

The principles of the invention may be most readily apprehended by describing the operation of the converter circuitry for a typical cycle of operation. For purposes of explanation it will be assumed that the astable multivibrator 230 has just switched to its particular switching state which biases the switching transistor 240 into its conducting state. This particular state of the multivibrator 230 will be referred to as its ON period. During the ON period the transistor 232 is in a nonconducting state. This nonconducting state is maintained in response to the negative charge contained on the capacitor 235. The transistors 233 and 234 are conducting in their saturated state due to the biasing current supplied by the saturated transistor 280 and flowing through the resistor 236 to the base of transistor 233.

A voltage is applied to the primary winding 261 of the transformer 260 when the transistor 234 is saturated. In response to this voltage, a voltage is induced in the secondary winding 262 of the transformer 260. This induced voltage causes a current to flow in the secondary winding 262. This current is applied, via a capacitor 264 and a forward biased diode 265, to the base electrode of the switching transistor 240. A diode 266 shunts the diode 265 and the base-collector junction of the switching transistor 240. The diode 266 drains off a sufficient amount of the base drive current to prevent the switching transistor 240 from being driven into saturation. The diode 265 is included in the base circuit of the switching transistor 240 to insure that the base-collector junction does not become forward biased by the forward voltage drop across the junction of diode 266. Hence, the ON time of the switching transistor 240 is not altered by the storage time due to stored charge in the base-collector junction. It is apparent from the foregoing that the ON time of transistor 240 is responsive only to the switching of the astable multivibrator 230.

The capacitor 264 is charged up to a steady state voltage by the periodic voltage pulse output of the secondary winding 262 after a few cycles of operation. The voltage on capacitor 264 equalizes the volt-time integral of successive ON and OFF times across the secondary winding 262. Without a balance control as described above the transformer 260 would have a larger DC current in its secondary winding 262 which would substantially add to the DC flux in its core. A high DC flux requires a large transformer to avoid saturation in operation. Hence with the balance network, a smaller transformer may be used without saturation occurring. Saturation must be avoided in transformer 260 to insure the generation of bias signals due to the periodic collapse of flux in the transformer core.

During the ON period when the switching transistor 240 is conducting, a current flows through the primary winding 271 storing electrical energy in the magnetic core of the transformer 270. The transformer polarities between the primary windings 271 and the secondary windings 272 and 273 are arranged so that the secondary voltages reverse bias the diodes 279 and 274. Hence during the ON period, the load current at output leads 221 and 222 is supplied by the energy stored on the capacitors 275 and 276 during the previous half cycle of operation.

A series connected resistor 204 and zener diode 205 shunt the input terminals 201. A constant reference voltage is derived from the input voltage applied to leads 201 by the zener diode 205. The resistor 204 limits the current flow through the zener diode 205. The constant reference voltage derived from the zener diode 205 is utilized to control the charging of the capacitor 237, via resistor 231, in the astable multivibrator 230 to a specified voltage level. The capacitor 235 in the other cross-coupled timing circuit in the astable multivibrator 230 charges through the resistor 238 at a rate proportional to the input voltage. The voltage on the capacitor 235 continues to increase until its voltage is sufficient to bias the transistor 232 into a conducting condition.

The duration of the ON period is determined by the magnitude of the input voltage charging the capacitor 235 through the resistor 238 since this voltage determines the time necessary to charge the capacitor 235 to a particular voltage. Hence if the input voltage varies, the duration of the ON period will vary accordingly. If the input voltage decreases in value, the time to charge capacitor 235 to a specified value will increase and hence the ON period will increase in duration. If the input voltage increases in value, it is apparent that the ON period will decrease in duration.

The transistor 232 in response to the voltage of capacitor 235 begins to conduct. It conducts increased amounts of current until it saturates. The collector voltage level of the transistor 232 decreases with saturation to the voltage of lead 203. This voltage is applied via capacitor 237, to the base of transistor 233 and transistor 234. The voltage is increased negatively by the amount of voltage on capacitor 237 and is sufficient to bias the transistors 233 and 234 into a nonconducting state. This added voltage occurs because the voltage of the capacitor 237 cannot change instantaneously. The diode 239 connected across the base emitter junction of transistor 233 acts to protect this junction against excessive reverse current during the application of the bias voltage and to reverse bias transistor 234.

The base current applied to the transistor 232 to keep it saturated and the charging current of the capacitor 235 are determined by the impedance of resistor 238. As the transistor 232 is driven into saturation, the capacitor 235 charges to the reference voltage level determined by the voltage drop across the zener diode 205.

When the transistor 234 is switched into its nonconducting state, the applied voltage is removed from the primary winding 261 of transformer 260. The collapsing flux of transformer 260 causes the voltage of the secondary winding 262 to reverse its polarity. This reverse polarity is applied to the base electrode of the switching transistor 240. This voltage biases the switching transistor 240 into a nonconducting state.

The feedback to control the OFF period as a function of the output voltage is derived from the voltage of the primary winding 271 of transformer 270. A feature of the invention is that the inductive reactance of the transformer 270 is selected so that the stored magnetic energy in the magnetic core never fully dissipates in any one operating cycle. This permits the feedback action to control the OFF period without the necessity of providing circuitry to sample and hold a function of the primary voltage. The feedback control circuitry includes the transistor 280, zener diode 284, the diode 283 and resistor 217. The zener diode 285 is coupled to the input voltage source and generates a stable reference voltage therefrom. This reference voltage is utilized as a stable operating voltage to energize the zener diode 284. The voltage induced in the resistor 217 plus the reference voltage of zener diode 284 and the voltage drop of diode 283 determines the conducting state of the transistor 280.

During the preceding half cycle or ON period the diode 287 was reverse biased and the transistor 280 was operating in its saturated state. In its state of saturation the collector current is limited in magnitude by the resistor 236 and the base current is limited in magnitude by the resistor 286. With the switching transistor 240 switched to its nonconducting state, the voltage of the primary winding 271 of the transformer 270 reverses polarity. This reverse polarity forward biases the diode 287 and applies a portion of the voltage across the primary winding to the resistor 217. The magnitude of this reverse voltage is proportional to the output voltage. The voltage induced across resistor 217 determines the collector-emitter current of transistor 280 which in turn determines the time necessary to fully charge the capacitor 237 of the astable multivibrator 230.

The OFF time of the astable multivibrator 230 is determined by the magnitude of the current transmitted by the transistor 280 which charges the capacitor 237. It is apparent from the foregoing that as the load voltage increases in magnitude, the induced voltage across the resistor 217 will likewise increase in magnitude. As the induced voltage across the resistor 217 increases, the collector-emitter current of transistor 280 decreases which in turn increases the OFF time to reduce the output voltage. If the load voltage decreases the OFF time will be decreased.

When the charge on the capacitor 237 reaches a voltage sufficient to bias the transistors 233 and 234 into conduction, the collector voltage of the transistor 233 begins to decrease. This decrease of voltage is coupled to the base of the transistor 232, via the capacitor 235. The transistor 232 is biased into a nonconducting state. The current flowing through the resistor 238 is sufficient to drive the transistors 233 and 234 into saturation which initiates the subsequent ON period.

During the ON period when the switching transistor 240 is conducting, current flows through the primary winding 271 and the transformer 270. This stores energy in the magnetic core of the transformer 270. During this ON period when current is flowing through the primary winding 271, the diodes 279 and 274 are reverse biased and the load current is supplied by the capacitors 275 and 276 from energy stored thereon during the previous OFF period. When current ceases to flow in the primary winding of 271 during the OFF period, the voltages across the secondary windings 272 and 273 of the transformer 270 reverse polarity. This reverse polarity forward biases the diodes 279 and 274. A current is supplied to the load which is coupled to the output leads 221 and 222. This current also replenishes the charge on the capacitors 275 and 276 which was partially dissipated during the previous ON period.

The mutually coupled inductors 291 included in the input leads 201 are included to prevent longitudinal noise currents from being transmitted to the DC source. The resistor 292 and capacitor 293 shunting the primary winding 271 are included to suppress ringing currents which may occur due to the switching action of the transistor 240.

What we claim is:

1. A switching-type voltage regulator comprising a direct current power source, an output circuit, a switching device to effect the transfer of energy from said source to said output circuit, timing means to control the switching of said switching device, energy storage means to store energy from said source when said switching device is transmitting and means to deliver energy from said energy storage means to said output circuit when said switching device is not transmitting, said energy storage means having a storage capacity sufficient to avoid a complete discharge of the stored energy during the time interval when the switching device is not transmitting, voltage detection means to monitor the voltage of said energy storage means, means to utilize the input voltage from said source to control the duration during which said switching device is transmitting and means responsive to said voltage detection means to control the duration during which said switching device is not transmitting.

2. A voltage regulator as defined in claim 1 including a pulse transformer coupling said timing device to said switching device, wherein said switching device comprises a transistor and further including means to prevent said transistor from saturating and a voltage storage capacitor to act as a stabilizing voltage source coupling said pulse transformer to said means to prevent, whereby said stabilizing voltage minimizes variations in the bias signal transmitted by said transformer which are due to variations in the conducting time of said switching transistor.

3. A voltage regulator as defined in claim 1 wherein said means to utilize the input voltage comprises a signal path interconnecting said source of energy to said timing means and said means responsive to said voltage detection means comprises a current source coupled to said timing means whose current output is responsive to a function of the output voltage as detected by said voltage detection means.

4. A voltage regulator as defined in claim 3 wherein said means to deliver energy comprises an output transformer and said energy storage means comprises the magnetic core of said output transformer, and said current source comprises a current transistor whose collector-emitter path couples said energy source to said timing means, and a bias resistor in the base circuit of said current transistor coupled to the primary of said output transformer through a diode poled to conduct only when energy is being transferred from said energy storage means to said load.

5. A DC to DC converter circuit comprising a source of energy, energy storage means, a load to be energized, a switching transistor coupling said source of energy and said energy storage means, energy transfer means to transfer energy from said energy storage means to said load to be energized, a free-running multivibrator to control the switching of said switching transistor by generating forward bias signals and reverse bias signals, first means to control the charging of one of the timing capacitors of said multivibrator in response to the voltage of said source of energy, second means to control the charging of the other timing capacitor of said multivibrator in response to the voltage of said energy transfer means, means to limit the forward bias signals applied to said switching transistor to prevent it from conducting in its saturated state, and means for equalizing the integral of the forward bias signal with the integral of the reverse bias signal applied to said switching transistor.

6. The inverter circuit as claimed in claim 5 further including a pulse transformer wherein said multivibrator is coupled to said switching transistor by said pulse transformer and said means for equalizing comprises a capacitor interconnecting said pulse transformer and said switching transistor to supply a stabilizing voltage to minimize variations in the bias signals transmitted by said pulse transformer.

7. The inverter circuit as claimed in claim 5 wherein said first means to control the charging of one of the timing capacitors includes a signal path interconnecting said source of energy to the timing capacitor and said second means to control the charging of the other timing capacitor comprises a current source whose current output is responsive to a function of the output voltage as detected through said energy transfer means.

8. The inverter circuit as claimed in claim 7 wherein said energy transfer means comprises a transformer and said current source comprises a current transistor whose collector-emitter path couples said energy source to said other timing capacitor, and a bias resistor in the base circuit of said current transistor coupled to the primary of said transformer through a diode poled to conduct only when energy is being transferred from said energy storage means to said load.